United States Patent [19]

Heider et al.

[11] Patent Number: 5,664,918
[45] Date of Patent: Sep. 9, 1997

[54] CARGO TIE DOWN DEVICE

[76] Inventors: Merle J. Heider, 203 12th St. SW.;
Dale J. Heider, 1108 8th Ave. SW.;
Leon J. Heider, 1107 Third Ave. SW.;
Craig J. Heider, 812 S. Taft St., all of Humboldt, Iowa 50548

[21] Appl. No.: 508,814

[22] Filed: Jul. 28, 1995

[51] Int. Cl.⁶ .................................................. B60P 7/08
[52] U.S. Cl. .......................... 410/103; 410/100; 410/101; 410/104; 254/332
[58] Field of Search ........................... 410/12, 50, 21, 410/97, 100, 101, 102, 103, 104; 242/592; 254/329, 332; 24/68 CD; 248/499

[56] References Cited

U.S. PATENT DOCUMENTS

| | | | |
|---|---|---|---|
| 3,319,906 | 5/1967 | Atkinson | 242/592 |
| 3,428,331 | 2/1969 | Morgan et al. | 410/100 |
| 3,697,045 | 10/1972 | Farley | 410/103 |
| 4,367,993 | 1/1983 | Miegs | 410/103 |
| 4,382,736 | 5/1983 | Thomas | 410/103 X |
| 4,475,854 | 10/1984 | Ericsson | 248/499 X |
| 4,842,458 | 6/1989 | Carpenter | 410/103 X |

FOREIGN PATENT DOCUMENTS 2247656   3/1992   United Kingdom ............ 410/103

Primary Examiner—Karen B. Merritt
Assistant Examiner—Stephen Gordon
Attorney, Agent, or Firm—Zarley, McKee, Thomte, Voorhees & Sease

[57] ABSTRACT

A cargo tie down device includes a winch having a mounting bracket, a winch shaft support and a winch shaft. The mounting bracket is secured to a vehicle, and the winch shaft support is rotatably mounted to the mounting bracket. The winch shaft is rotatable within the winch shaft support and is connected to a flexible member which is either attached to or extends over the cargo on the trailer. Tightening of the belt by the winch causes the winch to align relative to the belt in a position wherein the axis of the winch shaft is perpendicular to the longitudinal axis of the belt, regardless of the angle at which the belt is disposed.

4 Claims, 3 Drawing Sheets

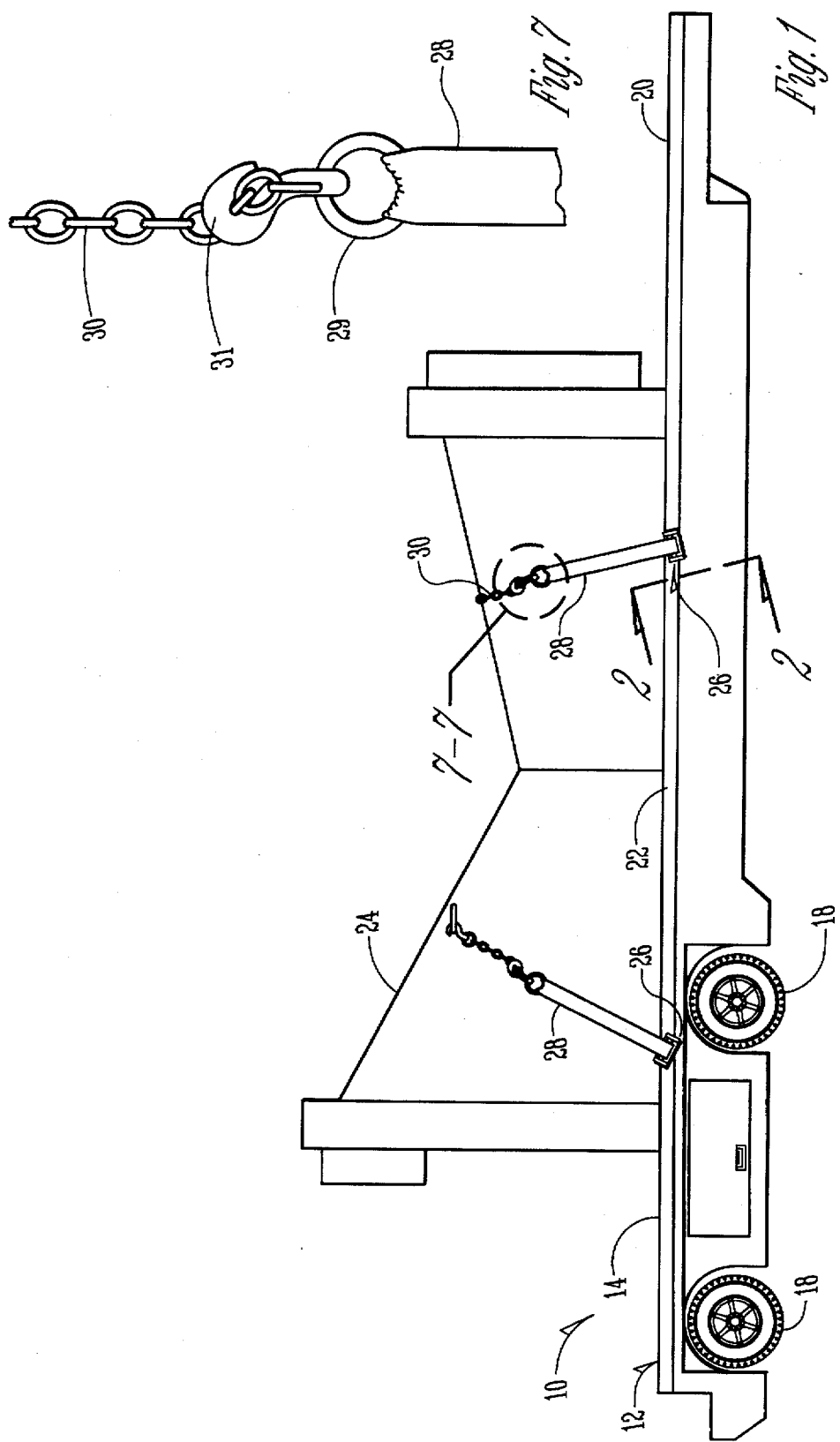

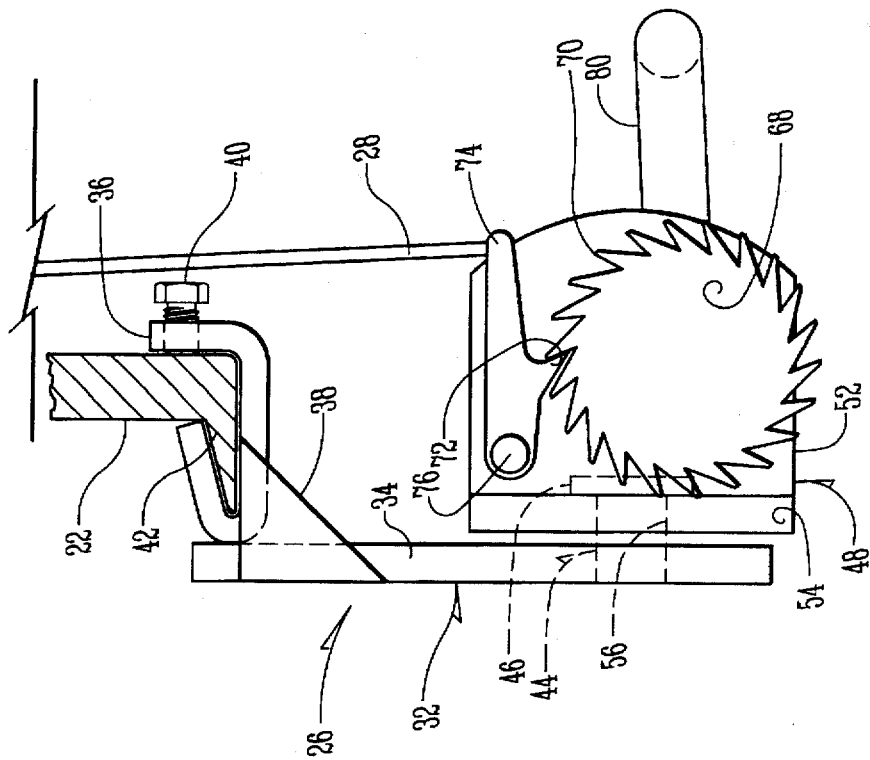
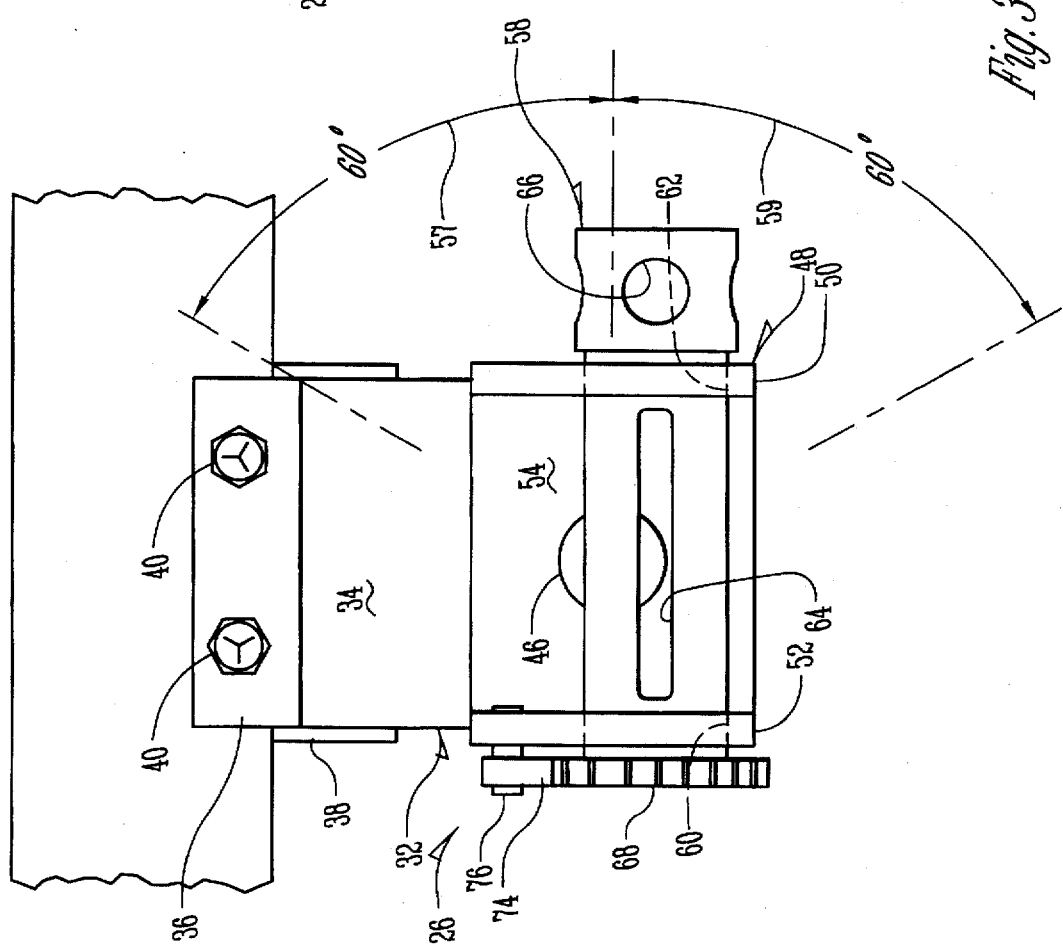

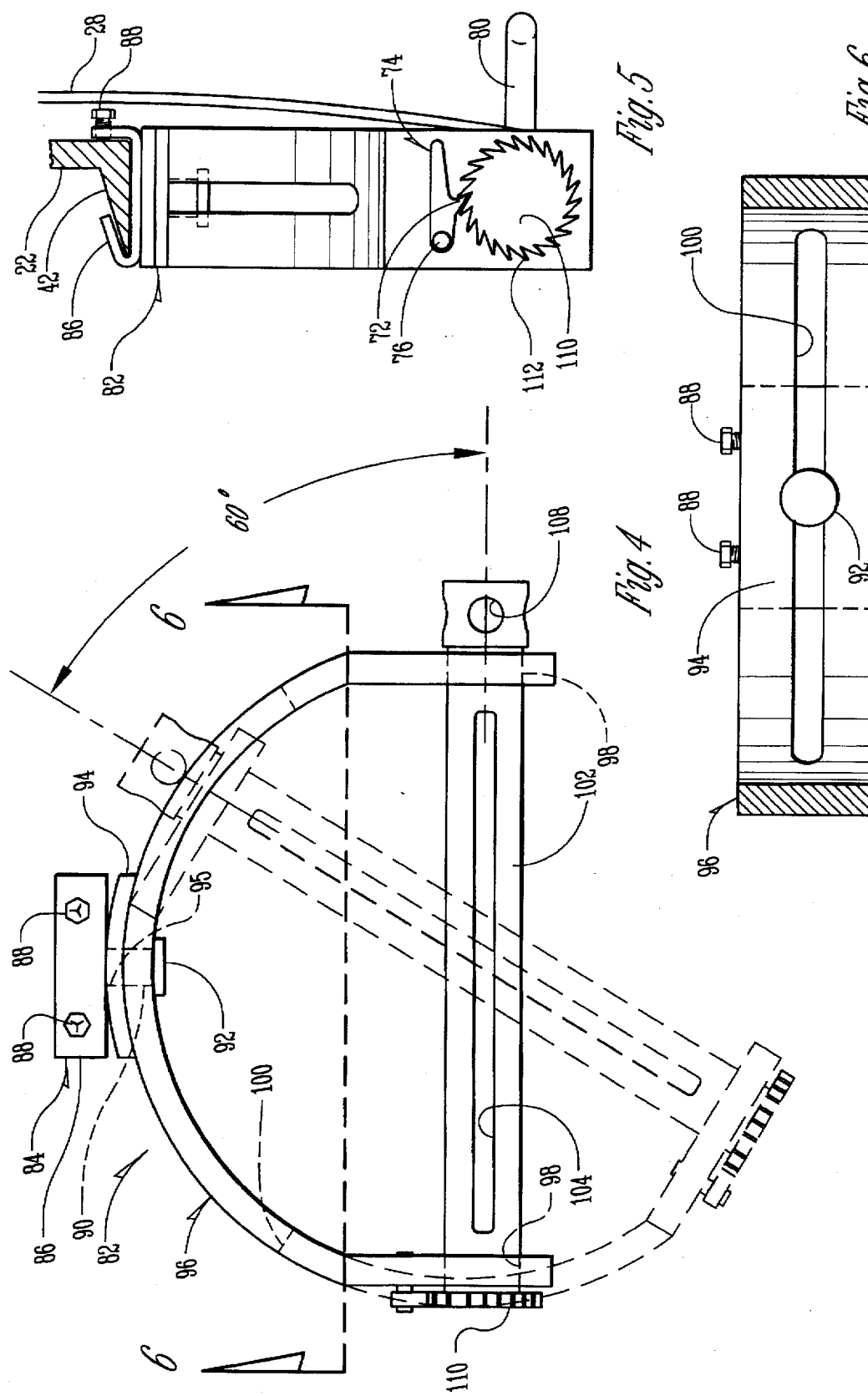

5,664,918

CARGO TIE DOWN DEVICE

BACKGROUND OF THE INVENTION

The present invention relates to a cargo tie down device and method for using same.

Tie down devices have commonly been used for tying down cargo resting on the surface of a flat bed truck trailer. Presently known tie down devices include a winch mounted to the side of the trailer bed. A strap is wound around the winch and passes over the cargo. Because the winch is mounted to the vehicle, the strap cannot be turned to an angle with respect to the surface of the flat bed. This creates difficulties in situations where irregularly shaped cargo requires the straps to be angled rather than to extend straight over on a line perpendicular to the horizontal surface of the bed.

Chains have sometimes been used to secure heavy equipment such as tractors and machinery to the flat bed. The chains almost always run at an angle. The only way to tighten these chains however, is to use a "load binder". A load binder has two hooks at each end and an offset toggle lever lock for tightening the chain. However, when tightening a chain with a load binder, often it is not possible to hook the load binder at the proper link of the chain in order to achieve the maximum tightness. When this happens the resulting connection is looser than desired which can result in an unsafe condition.

Presently known winches are not able to solve the problem of the above chains because the chains run at an angle and the straps of presently known winches cannot be used at an angle due to the securement of the winch to the side of the vehicle.

Therefore, a primary object of the present invention is the provision of an improved cargo tie down device and method for using same.

A further object of the present invention is the provision of an improved cargo tie down device which can use a combination of belts, chains and winches to maximize the tightness with which the cargo is held on the platform of the trailer.

A further object of the present invention is the provision of an improved cargo tie down device which can extend at a plurality of angles relative to the vehicle platform bed so as to achieve the optimum angle for holding the cargo securely.

A further object of the present invention is the provision of an improved cargo tie down device and method for using same which are economical to manufacture, durable in use and efficient in operation.

SUMMARY OF THE INVENTION

The foregoing objects may be achieved by a combination including a trailer having an elongated platform. The platform has a longitudinal axis, an upper surface and opposite lateral edges. A cargo rests upon the upper surface of the platform. A winch is mounted to the sides of the vehicle and includes a winch mounting bracket, a winch shaft support and a winch shaft. The winch shaft includes a longitudinal shaft axis and is rotatably mounted to the winch support for rotation about the longitudinal axis of the shaft. The winch bracket is operatively secured to the platform adjacent one of the lateral edges of the platform. Connecting means connect the winch bracket to the winch shaft support and permit the winch support to rotate relative to the winch bracket about a horizontal axis perpendicular to the longitudinal axis of the platform. An elongated flexible member includes a first end wound around the winch shaft and extending over the cargo. The flexible member includes a second end operatively attached to the other of the lateral edges of the platform.

The foregoing combination permits the flexible member to extend at any of a plurality of angles relative to the horizontal platform so as to achieve an optimum angle for holding the cargo securely to the platform. When the desired angle of the flexible member is achieved, the winch shaft support rotates so as to present the winch shaft at an angle which is perpendicular to the longitudinal axis of the flexible member. It is then possible to rotate the winch shaft to tighten the flexible member and securely fasten the cargo to the surface of the platform.

BRIEF DESCRIPTION OF THE FIGURES OF THE DRAWINGS

FIG. 1 is a side elevational view of a flat bed trailer having cargo thereon and having the cargo tie down device of the present invention.

FIG. 2 is an enlarged sectional view taken along line 2—2 of FIG. 1.

FIG. 3 is a front elevational view taken from the right hand side of FIG. 2, but showing the tie down strap removed.

FIG. 4 is a view similar to FIG. 3, but showing a modified form of the invention.

FIG. 5 is a side elevational view of the modified form of the invention shown in FIG. 4 as viewed from the left hand side of FIG. 4.

FIG. 6 is a sectional view taken along line 6—6 of FIG. 4.

FIG. 7 is an enlarged detail view taken along line 7—7 of FIG. 1.

DETAILED DESCRIPTION OF THE PREFERRED EMBODIMENT

Referring to the drawings the numeral 10 generally designates a trailer of the flat bed type. Trailer 10 includes a horizontal platform 12 having an upper surface 14 supported by a trailer frame which has a plurality of ground engaging wheels 18 rotatably mounted thereon. A trailer tongue 20 is adapted to be mounted to the fifth wheel of a tractor. Extending along the side of platform 12 is a side channel 22 (FIG. 2) which is C-shaped in cross section. Resting upon the upper surface 14 of platform 12 is a cargo 24 having an irregular shape.

A pair of winches 26 are mounted to the side channel 22 and are each attached to a tie down belt 28. Tie down belt 28 includes a ring 29 (FIG. 7) which is attached to a hook 31 hooked into one of the links of a tie down chain 30. The structure of winch 26 is shown in more detail in FIGS. 2 and 3. Winch 26 includes a winch bracket 32 comprising a vertical plate 34 having at its upper edge a retainer clip 36 which is secured by means of a gusset 38. Retainer clip 36 has a cross sectional configuration which permits it to slide along the lower most flange 42 of the side channel 22. A bolt 40 is threaded through clip 36 and retentively engages the side channel 22. The clip 36 can be moved along the length of channel 22 to the desired position and then secured in place by tightening a bolt 40. The use of bolt 40 is optional, and it is possible to eliminate bolt 40 entirely without detracting from the invention.

Side channel 22 provides an elongated winch track for the winches 26. The winch track 22 is shown in the drawings to be C-shaped in cross section, but various different cross sections are used in different trailers. Therefore the cross sectional configuration of clip 36 may need to be changed to permit it to fit the particular winch track used on a given trailer.

Extending outwardly from the lower end of vertical plate 34 is a pivot pin 44 having a head 46 on its outer end. Rotatably mounted over the pivot pin 44 is a winch shaft frame 48 having opposite side flanges 50, 52 and a web 54 which together form a C-shaped configuration. The pivot pin 44 of winch bracket 32 extends rotatably through a pivot hole 56 in web 54. The head 46 on pin 44 holds the winch shaft frame 48 on the shaft 44. Thus, winch shaft frame 48 is free to pivot approximately 120° about a horizontal axis provided by pivot pin 44, the horizontal axis extending generally perpendicular to the longitudinal axis of the platform 12. The pivotal range of 120° is illustrated in FIG. 3 by arrows 57, 59.

As will also be appreciated by one skilled in the art in view of FIG. 2, the pivot pin 44 can be fixed, for example by press fitting it, on the winch shaft frame 48. The bracket 32 can be rotatably mounted over the pin 44 with the head 46 being located on the opposite end from that shown. Thus, the pivot pin can be fixed on either one of the winch bracket and the winch support or frame and the result will be the same, the frame and bracket will be rotatable with respect to each other about the pivot pin axis.

A winch shaft 58 extends through two shaft receiving holes 60, 62 in the side flanges 50, 52. On one end of winch shaft 58 is a handle receiving hole 66 and on the opposite end of the shaft 58 is a ratchet 68. Between the two side flanges 50, 52 of winch shaft frame 48, the winch shaft 58 includes an elongated belt receiving slot 64.

Ratchet 68 includes a plurality of ratchet teeth 70 on its outer periphery which are adapted to engage a locking pawl 72 mounted on a pivotal arm 74 which pivots about pivot pin 76. Locking pawl 72 pivots into engagement with the teeth 70 so as to prevent the rotation of winch shaft 58 in a counterclockwise direction as shown in FIG. 2. A crank handle 80 may be fitted within the handle receiving hole 66 of winch shaft 58 for rotating the shaft in a clockwise direction to tighten a belt 28 which has been secured in the belt receiving slot 64.

In operation, the belt 28 is secured to the winch shaft 58 by inserting one end of belt 28 into the belt receiving slot 64. The opposite end of the belt 28 is secured to a chain 30 by means of hook 31. The chain 30 may be extended over the cargo 24 and attached to the other side as shown in the right hand side of FIG. 1, or it can be secured directly to the cargo 24 as shown in the left hand side of FIG. 1. Furthermore, it is possible to use a winch similar to winch 26 on both of the opposite sides of the cargo 24 so that each of the two winches can be tightened from either side. The winches are tightened until the chain and belt are taut. This causes the chain or belt to assume an angle which is on a straight line from the winch to the point of attachment to the cargo. Because the winch shaft frame rotates about pin 44, the winch shaft 58 is permitted to rotate about that horizontal axis until it is perpendicular to the longitudinal axis of the belt 28. This permits the belt to wind evenly on the shaft 58. The winch handle 80 can then be used to tighten the belt so as to provide very tight positive securement of the cargo 24 to the surface 14 of the trailer 10.

Referring to FIGS. 4-6 a modified form of the invention is designated by the numeral 82. In this modification a winch bracket 84 includes a winch clip 86 adapted to fit over lower flange 42 of side channel 22 as shown in FIG. 5. Bolts 88 can be used to secure the clip 86 against longitudinal sliding movement on channel 22.

Secured to the clip 86 and extending downwardly therefrom is a pivot pin 90 having a head 92 thereon. Rotatably mounted over the pivot pin 90 is an arcuate bearing plate 94 which includes a hole 95 extending therethrough so as to permit the arcuate plate 94 to be loosely held on the pivot pin 90.

Also mounted on pivot pin 90 is an arcuate winch shaft frame 96. Frame 96 includes a pair of shaft receiving holes 98 at its opposite ends, and also includes a longitudinal slot 100 therein. The pivot pin 90 extends through the longitudinal slot 100 and the head 92 on pivot pin 90 retains the arcuate winch shaft frame 96 thereon. This permits the winch shaft frame 96 to pivot about a horizontal axis perpendicular to the longitudinal axis of the trailer 10 by merely sliding the winch shaft frame on pin 90 from the position shown in solid lines in FIG. 4 to the position shown in shadow lines in FIG. 4. Similarly it can be rotated in the opposite direction.

A winch shaft 102 extends through the shaft receiving holes 98 and includes a belt receiving slot 104, a handle receiving hole 108 and a ratchet 110 having teeth 112 thereon, similar to the winch shaft shown in FIGS. 2 and 3.

In operation the winch 82 is permitted to align with the angle of the belt 28 by virtue of the sliding action of pin 90 in slot 100. Once the winch shaft frame 96 has been rotated into proper alignment with the belt 28, the crank handle 80 may be rotated to tighten the belt to achieve the desired tautness in the belt 28 and the chain 30.

The present invention permits the use of chains which are not likely to be broken when passing over sharp edges of the cargo, yet at the same time permits the use of a belt and a winch for tightening the chain to achieve the desired tautness. The swivel action of the winches 26, 82 permit them to self align as the tightness of the belt 28 increases. The swivel winch of the present invention can be used on any type of flat bed trailer, drop deck trailer or truck bed. It can also be used to secure almost any type of load regardless of the shape or orientation of the load on the platform 12.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. In combination:
    a trailer;
    an elongated platform on said trailer having a longitudinal axis, an upper surface and opposite lateral edges;
    a cargo resting on said upper surface of said platform;
    a winch having a winch mounting bracket, a winch shaft support, and a winch shaft;
    said winch shaft having a longitudinal shaft axis and being rotatably mounted to said winch shaft support for rotation about said longitudinal shaft axis;
    said winch mounting bracket being operatively secured to said platform adjacent one of said lateral edges of said platform;
    connecting means connecting said winch mounting bracket to said winch shaft support and permitting said winch shaft support to rotate relative to said winch mounting bracket about an axis approximately perpendicular to said longitudinal axis of said platform;

an elongated flexible member having a first end wound around said winch shaft and having a second end operatively retentively engaging said cargo to hold said cargo on said platform;

said winch shaft support comprising an elongated arcuate member;

said connecting means comprising a pin on said winch mounting bracket and an elongated slot in said arcuate member whereby said arcuate member is free to slide longitudinally on said pin to cause said rotation about said axis approximately perpendicular to said longitudinal axis of said platform.

2. In combination:

a trailer;

an elongated platform on said trailer having a longitudinal axis, an upper surface and opposite lateral edges;

a cargo resting on said upper surface of said platform;

a winch having a winch mounting bracket, a winch shaft support and a winch shaft;

said winch shaft having a longitudinal shaft axis and being rotatably mounted to said winch shaft support for rotation about said longitudinal shaft axis;

said winch mounting bracket being operatively secured to said platform adjacent one of said lateral edges of said platform;

connecting means connecting said winch mounting bracket to said winch shaft support and permitting said winch shaft support to rotate relative to said winch mounting bracket about an axis approximately perpendicular to said longitudinal axis of said platform;

an elongated flexible member having a first end wound around said winch shaft and having a second end operatively retentively engaging said cargo to hold said cargo on said platform;

a bracket mounting means mounting said winch mounting bracket to said one lateral edge of said platform for longitudinal sliding movement along said one lateral edge of said platform;

said bracket mounting means comprising an elongated flange extending along said one lateral edge of said platform and a bracket clip on said winch mounting bracket and coupled to said elongated flange for sliding movement thereon.

3. In combination;

a trailer;

an elongated platform on said trailer having a longitudinal axis, an upper surface and opposite lateral edges;

a cargo resting on said upper surface of said platform;

a winch having a winch mounting bracket, a winch shaft support, and a winch shaft;

said winch shaft having a longitudinal shaft axis and being rotatably mounted to said winch shaft support for rotation about said longitudinal shaft axis;

said winch bracket being slidingly adjustable along and selectively secured by at least one clamp screw to one of said lateral edges of said platform;

connecting means connecting said winch mounting bracket to said winch shaft support and permitting said winch shaft support to rotate relative to said winch mounting bracket about a horizontal axis approximately perpendicular to said longitudinal axis of bald platform;

an elongated flexible member having a first end wound around said winch shaft and having, a second end operatively retentively engaging said cargo to hold said cargo on said platform.

4. The combination of claim 3 wherein the connecting means includes a pin pivotally interconnecting the winch mounting bracket and the winch shaft support, the pivot pin defining said axis approximately perpendicular to said longitudinal axis of said platform, the pivot pin having a shoulder at one end.

* * * * *